US012634801B2

(12) United States Patent
Henry et al.

(10) Patent No.: US 12,634,801 B2
(45) Date of Patent: May 19, 2026

(54) STRANDED AP RECOVERY

(71) Applicant: Cisco Technology, Inc., San Jose, CA (US)

(72) Inventors: Jerome Henry, Pittsboro, NC (US); John M. Swartz, Lithia, FL (US); James F. Florwick, Frederick, MD (US); Domenico Ficara, Essertines-sur-Yverdon (CH); Amine Choukir, Lausanne (CH); Arun G. Khanna, Sunnyvale, CA (US); Sachin D. Wakudkar, St-Sulpice (CH)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 17/820,094

(22) Filed: Aug. 16, 2022

(65) Prior Publication Data

US 2024/0064609 A1 Feb. 22, 2024

(51) Int. Cl.
| | |
|---|---|
| *H04W 12/04* | (2021.01) |
| *H04L 9/32* | (2006.01) |
| *H04L 41/0631* | (2022.01) |
| *H04W 24/00* | (2009.01) |

(Continued)

(52) U.S. Cl.
CPC ......... *H04W 40/34* (2013.01); *H04L 41/0631* (2013.01); *H04W 76/10* (2018.02)

(58) Field of Classification Search
CPC ..... H04W 40/34; H04W 24/00; H04W 88/18; H04W 76/10; H04W 12/73; H04W 12/03; H04L 41/0631; H04L 63/062; H04L 41/0668; H04L 63/0435; H04L 63/0442;

(Continued)

(56) References Cited

U.S. PATENT DOCUMENTS

| | | | | | |
|---|---|---|---|---|---|
| 9,459,976 | B1 * | 10/2016 | Sun | ......................... | G06F 11/00 |
| 10,117,169 | B2 * | 10/2018 | Xie | ...................... | H04W 48/18 |
| 10,985,898 | B2 * | 4/2021 | Kim | ................... | H04W 52/146 |

(Continued)

FOREIGN PATENT DOCUMENTS

| | | | | | |
|---|---|---|---|---|---|
| EP | | 2207378 A1 * | 7/2010 | ............ | H04W 24/00 |
| WO | WO-2015167061 A1 * | | 11/2015 | ............ | H04W 24/00 |

OTHER PUBLICATIONS

Cisco.com, "Troubleshooting," Cisco Wireless Mesh Access Points, Design and Deployment Guide, Release 7.3, Date Access: Aug. 16, 2022, pp. 1-22.

*Primary Examiner* — Steven Hieu D Nguyen
*Assistant Examiner* — Vanneilian Lalchinthang
(74) *Attorney, Agent, or Firm* — Patterson + Sheridan, LLP

(57) ABSTRACT

Techniques for wireless communication are disclosed. These techniques include determining that a first wireless access point (AP) has a failure to connect to a controller. The techniques further include identifying one or more neighbor APs, for the first AP, as candidate rescue APs, selecting a rescue AP, from among the candidate rescue APs, and establishing a secure connection from the first AP to the rescue AP. The techniques further includes transmitting diagnostic data from the first AP to the controller using the secure connection from the first AP to the rescue AP. The diagnostic data relates to the failure to connect from the first AP to the controller, and the controller is configured to use the diagnostic data to assist in establishing a connection from the first AP to the controller that bypasses the rescue AP.

20 Claims, 7 Drawing Sheets

(51) Int. Cl.
  *H04W 40/34*        (2009.01)
  *H04W 76/10*        (2018.01)
(58) Field of Classification Search
  CPC ... H04L 43/0811; H04L 9/0838; H04L 9/085;
                                H04L 9/3247
  USPC ........................................................ 370/216
  See application file for complete search history.

(56)                References Cited

U.S. PATENT DOCUMENTS

| | | | |
|---|---|---|---|
| 11,115,813 B1 | 9/2021 | Parker et al. | |
| 11,277,319 B2 * | 3/2022 | Huang .................. | H04W 24/06 |
| 11,432,138 B1 * | 8/2022 | Jiang ..................... | H04L 63/062 |
| 2011/0149850 A1 * | 6/2011 | Sashihara ............ | H04W 48/16 |
| | | | 370/328 |
| 2015/0296446 A1 * | 10/2015 | Fischer ............. | H04W 52/0254 |
| | | | 370/338 |
| 2016/0112886 A1 * | 4/2016 | Malik .................. | H04W 24/04 |
| | | | 370/225 |
| 2016/0373306 A1 * | 12/2016 | Saha ........................ | H04W 4/80 |
| 2020/0244517 A1 * | 7/2020 | Prasad ................ | H04L 41/0668 |
| 2022/0264668 A1 * | 8/2022 | Lumbatis ............. | H04W 76/38 |

* cited by examiner

STRANDED AP RECOVERY

TECHNICAL FIELD

Embodiments presented in this disclosure generally relate to wireless communication. More specifically, one or more embodiments disclosed herein relate to recovery for a wireless access point (AP) stranded from a controller.

BACKGROUND

Modern wireless communication network deployments can include a very large number of APs. In particular, temporary deployments (e.g., for conferences, sporting events, concerts, festivals, and other large events) can require that hundreds of APs be deployed in a short time frame. This often results in some of the deployed APs appearing to be properly placed and connected, but failing to communicate with an expected wireless controller (e.g., a wireless local area network (LAN) controller (WLC)). This could stem from a faulty cable used for configuration between the AP and the WLC (e.g., a cable that provides power but not a proper data communication channel from the AP to the WLC), incorrect local switch configuration (e.g., an AP connected to the wrong port or the wrong virtual LAN (VLAN) to communicate with the WLC), or numerous other potential problems.

Existing solutions for this problem typically involve attempting to manually identify the stranded APs. For example, a stranded AP may emit an indication that it is stranded (e.g., a flashing LED light or pattern of LED lights). But identifying the stranded AP requires an administrator or technician to physically walk the area to view the indication. This can be extremely challenging where the deployment is large, or where the AP is located in an area not readily visible to the administrator (e.g., above ground, enclosed, in a bright area where an LED indication is difficult to see, etc.). Difficulty in identifying the stranded APs results in significantly decreased network performance for users (e.g., users of wireless stations (STAs) connecting to the APs), wasted time and frustration from administrators, wasted network bandwidth, and wasted network equipment, among other problems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
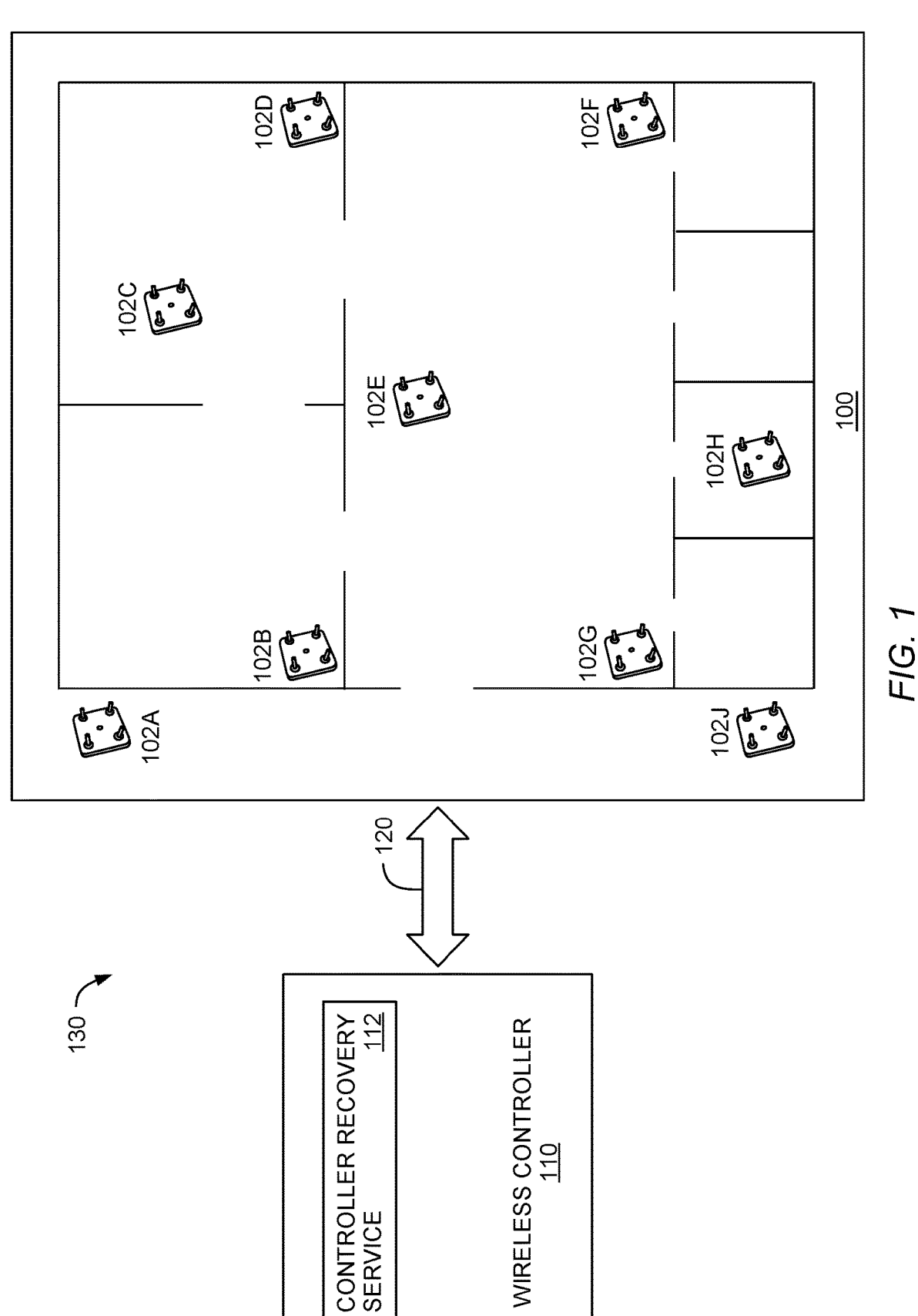
FIG. 1 illustrates a wireless network computing environment with recovery for a stranded AP, according to one embodiment.

Embodiments include a method. The method includes determining that a first wireless access point (AP) has a failure to connect to a controller. The method further includes identifying one or more neighbor APs, for the first AP, as candidate rescue APs, selecting a rescue AP, from among the candidate rescue APs, and establishing a secure connection from the first AP to the rescue AP. The method further includes transmitting diagnostic data from the first AP to the controller using the secure connection from the first AP to the rescue AP. The diagnostic data relates to the failure to connect from the first AP to the controller, and the controller is configured to use the diagnostic data to assist in establishing a connection from the first AP to the controller that bypasses the rescue AP.

Embodiments further include a first AP, including: one or more wireless radios, a wired network interface, a processor, and a memory having instructions stored thereon which, when executed on the processor, performs operations. The operations include determining that the first AP has a failure to connect to a controller using the wired network interface, identifying one or more neighbor APs, for the first AP, as candidate rescue APs using at least one of the one or more wireless radios, selecting a rescue AP, from among the candidate rescue APs, and establishing a secure connection from the first AP to the rescue AP using at least one of the one or more wireless radios, and transmitting diagnostic data from the first AP to the rescue AP using at least one of the one or more wireless radios. The rescue AP is configured to relay the diagnostic data to the controller. The diagnostic data relates to the failure to connect from the first AP to the controller, and the controller is configured to use the diagnostic data to assist in establishing a connection from the first AP to the controller using the wired network interface.

Embodiments further include a non-transitory computer-readable medium having instructions stored thereon which, when executed by a processor, performs operations. The operations include determining that a first AP has a failure to connect to a controller. The operations further include identifying one or more neighbor APs, for the first AP, as candidate rescue AP, selecting a rescue AP, from among the candidate rescue APs, and establishing a secure connection from the first AP to the rescue. The operations further include transmitting diagnostic data from the first AP to the controller using the secure connection from the first AP to the rescue AP. The diagnostic data relates to the failure to connect from the first AP to the controller, and the controller is configured to use the diagnostic data to assist in establishing a connection from the first AP to the controller that bypasses the rescue AP.

EXAMPLE EMBODIMENTS

In an embodiment, one or more techniques disclosed herein can be used for recovery of a stranded AP. For example, a stranded AP can perform a connection diagnostic to identify possible reasons for a failure to connect to the appropriate WLC. This can include problems with a cable connected to the AP, problems with a connection from the AP to a switch system, problems with obtaining an internet protocol (IP) address or connecting to a layer 3 (L3) system beyond a local gateway, problems establishing a connection with a WLC that is otherwise reachable from the AP, or any other suitable problems. These connection diagnostics are discussed further, below, with regard to FIGS. 3-4.

In an embodiment, a stranded AP can provide the connection diagnostic information to a WLC through a neighboring rescue AP. For example, the stranded AP can identify potentially suitable neighbor APs, select a neighbor AP, and establish a secure connection to the selected neighbor AP (e.g., using a secure rescue mode). This is discussed further, below, with regard to FIGS. 3 and 5-6. The stranded AP can then transmit the connection diagnostic information to the WLC using the selected neighbor AP. Further, in an embodiment, the stranded AP may be permitted to establish a full connection to the WLC through the selected neighbor AP. This is discussed further, below, with regard to FIGS. 3 and 7.

In an embodiment, security concerns are also taken into account for these rescue techniques. As discussed further below, one or more techniques described herein allow for secure communication from a stranded AP to a controller. This can be used both to allow the stranded AP to securely transmit diagnostic information to the controller, and to allow the stranded AP to operate quasi-normally through a neighbor AP acting as a rescue AP (e.g., temporarily while the problem that left the AP stranded is solved).

FIG. 1 illustrates a wireless network computing environment 130 with recovery for a stranded AP, according to one embodiment. In an embodiment, the computing environment 130 includes an AP deployment 100 and a wireless controller 110 (e.g., a WLC). The AP deployment 100 can include a number of APs 102A-J. In an embodiment, the APs 102A-J can be configured to connect to the wireless controller 110 using a wired connection 120. For example, each of the APs 102A-J can be connected to a suitable cable and can establish the wired connection 120 to the wireless controller 110 using the cable. In an embodiment, the wired connection 120 can be any suitable wired network connection, including a power over Ethernet (PoE) connection, an optical connection, another Ethernet connection, or any other suitable wired connection. Further, in an embodiment, each of the APs 102A-J includes one or more wireless radios used to connect to STAs for wireless communication. For example, of the APs 102A-J can include any, or all, of a 5 GHz wireless radio, a 2.4 GHz wireless radio, a 6 GHz wireless radio, or any other suitable wireless radio.

In an embodiment, most of the APs 102A-J are able to connect to the wireless controller 110 using the wired connection 120, but one or more of the APs 102A-J are not able to connect to the wireless controller 110. For example, one or more of the APs 102A-J is unable to establish a connection to the wireless controller 110. For example, the APs 102A-H are able to establish a connection to the wireless controller 110 using the wired connection 120, but the AP 102J is not able to establish a connection. The AP 102J could be connected to a faulty cable, could be misconfigured, could be unable to connection to a switching system, or could have any number of problems leading to an inability for the AP 102J to connect to the wireless controller 110 using the wired connection 120. The AP 102J is stranded from the wireless controller 110.

In an embodiment, the wireless controller 110 includes a controller recovery service 112. As discussed further, below, with regard to FIG. 2, the controller recovery service 112 can facilitate allowing the wireless controller 110 to recover the AP 102J. For example, as discussed further below with regard to FIGS. 3-7, the AP 102J can perform connection diagnostics (e.g., using a suitable AP recovery service, as discussed further below with regard to FIG. 2) to identify the source of the failure to connect to the wireless controller 110.

The AP 102J can further identify neighboring APs (e.g., the AP 102G or the AP 102H) that the AP 102J can communicate with (e.g., using a suitable wireless radio). The AP 102J can select one of these neighboring APs to act as a rescue AP, and can communicate with the wireless controller 110 using the selected rescue AP. This can include transmitting the connection diagnostic information from the AP 102J to the wireless controller 110 (e.g., to allow an administrator to identify the stranded AP and solve the connection problem), establishing a full wireless connection from the AP 102J to the wireless controller 110 (e.g., using the selected rescue AP as a relay), or taking any other suitable action.

Figure 2:
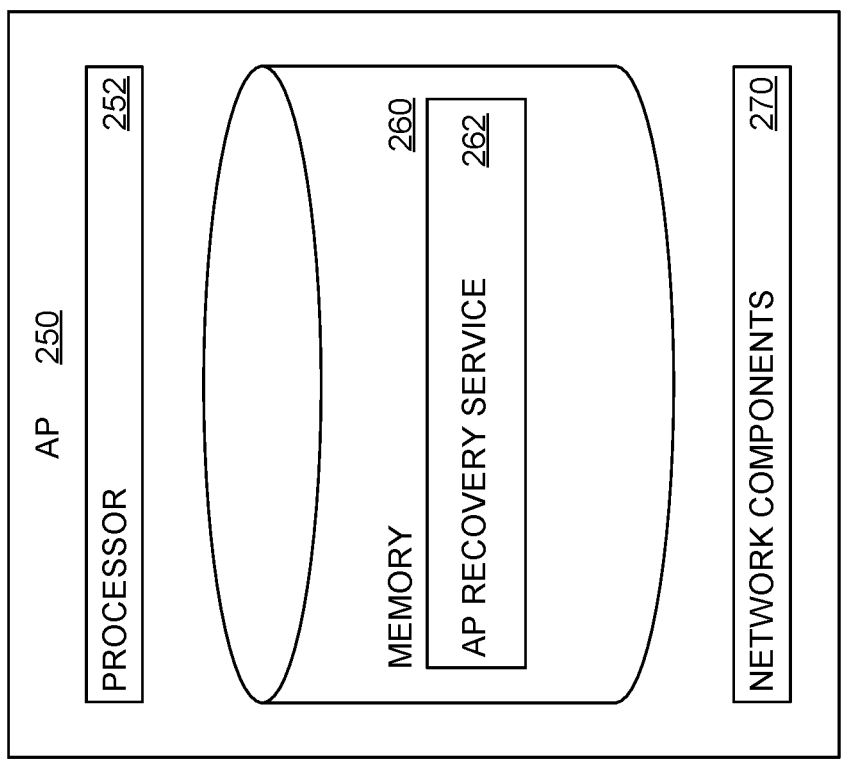
FIG. 2 illustrates block diagrams for a wireless controller and AP for recovery for a stranded AP, according to one embodiment.
Figure 2:
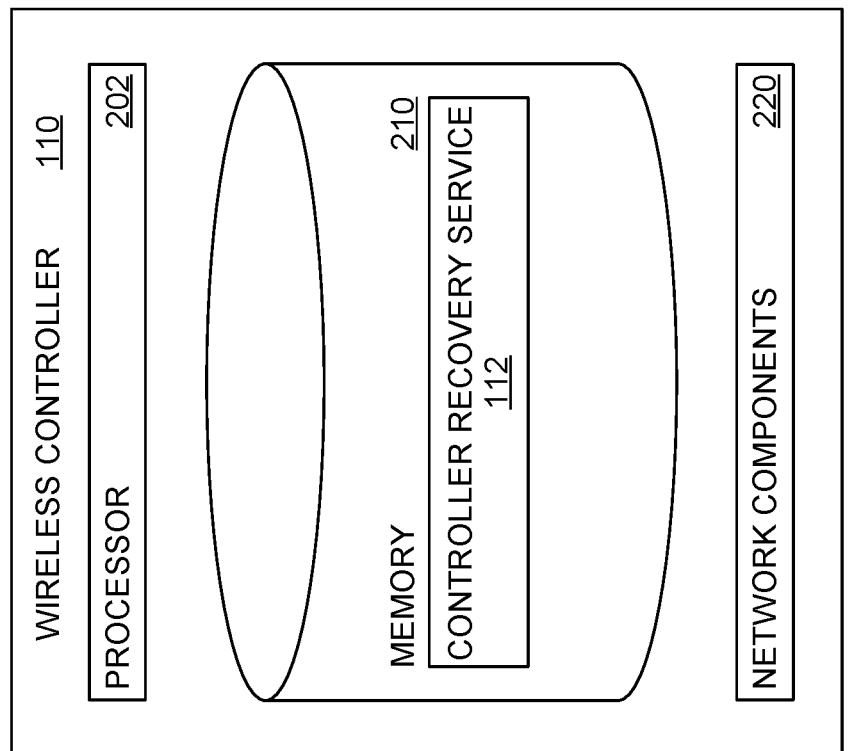

FIG. 2 illustrates block diagrams for a wireless controller 110 and an AP 250 for recovery for a stranded AP, according to one embodiment. The wireless controller 110 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the wireless controller 110 to interface with a suitable communication network (e.g., the computing environment 130 illustrated in FIG. 1). For example, the network components 220 can include one or more wired network components, one or more WiFi components (e.g., one or more wireless radios), or one or more cellular network interface components, and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the wireless controller 110. The program code is generally described as various functional "applications" or "modules" within the memory 210, although alternate implementations may have different functions and/or combinations of functions. Within the memory 210, the controller recovery service 112 facilitates recovery of an AP stranded from the wireless controller 110. This is discussed further below with regard to FIGS. 3-7.

In an embodiment, the AP 250 corresponds with any of the APs 102A-J illustrated in FIG. 1. The AP 250 includes a processor 252, a memory 260, and network components 270. The memory 260 may take the form of any non-transitory computer-readable medium. The processor 252 generally retrieves and executes programming instructions stored in the memory 260. The processor 252 is representative of a single central processing unit (CPU), multiple CPUs, a single CPU having multiple processing cores, graphics processing units (GPUs) having multiple execution paths, and the like.

The network components 270 include the components necessary for the AP 250 to interface with a suitable communication network (e.g., the computing environment 130 illustrated in FIG. 1). For example, the network components 270 can include one or more wired network components, one or more WiFi components (e.g., one or more wireless radios), or one or more cellular network interface components, and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the AP 250. The program code is generally described as various functional "applications" or "modules" within the memory 260, although alternate implementations may have different functions and/or combinations of functions. Within the memory 260, the AP recovery service 262 facilitates recovering a stranded AP to a suitable wireless controller. This is discussed further below with regard to FIGS. 3-7.

While the wireless controller 110 and AP 250 are each illustrated as a single entity, in an embodiment, the various components can be implemented using any suitable combination of physical compute systems, cloud compute nodes and storage locations, or any other suitable implementation. For example, the wireless controller 110, AP 250, or both could be implemented using a server or cluster of servers. One or more of the components of the wireless controller 110, AP 250, or both can be implemented using a public cloud, a private cloud, a hybrid cloud, or any other suitable implementation. Further, the wireless controller 110, AP 250, or both may include one or more computing platforms, such as computer servers for example, which may be co-located, or may form an interactively linked but distributed system, such as a cloud-based system.

Further, although FIG. 2 depicts the controller recovery service 112 and the AP recovery service 262 as being located in the respective memories 210 and 260, that representation is also merely provided as an illustration for clarity. More generally, the wireless controller 110, AP 250, or both may include one or more computing platforms, such as computer servers for example, which may be co-located, or may form an interactively linked but distributed system, such as a cloud-based system. As a result, processors 202 and 252 and memories 210 and 260, may correspond to distributed processor and memory resources within the computing environment 130. Thus, it is to be understood that the controller recovery service 112, the AP recovery service 262, or both, may be stored remotely within the distributed memory resources of the computing environment 130.

Figure 3:
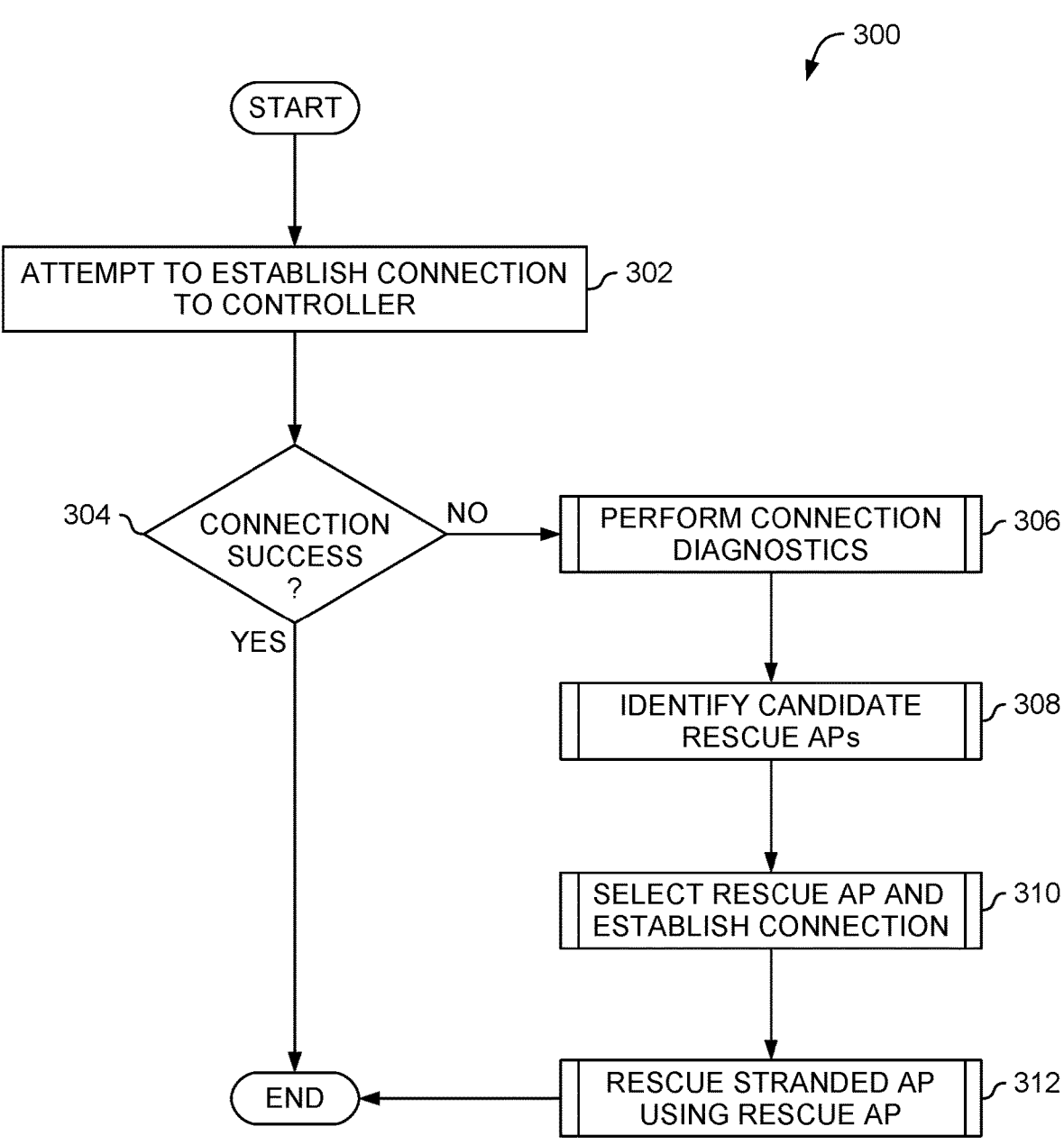
FIG. 3 is a flowchart illustrating recovery for a stranded AP, according to one embodiment.

FIG. 3 is a flowchart 300 illustrating recovery for a stranded AP, according to one embodiment. At block 302 an AP recovery service (e.g., the AP recovery service 262 illustrated in FIG. 2) attempts to establish a connection to a controller (e.g., the AP 250 illustrated in FIG. 2 attempts to establish a connection to the wireless controller 110 illustrated in FIGS. 1-2). The AP recovery service is merely one example, and the AP can use any suitable software service to attempt to establish the connection to the controller.

In an embodiment, the AP recovery service can undertake to establish an initial connection to the controller. For example, the AP recovery service can attempt to transmit management messages (e.g., control and provisioning of wireless access point (CAPWAP) messages) to a desired controller using a wired connection. Using FIG. 1 as an example, any of the APs 102A-J can attempt to transmit CAPWAP messages to the wireless controller 110 using the wired connection 120.

At block 304, the AP recovery service determines whether the connection to the controller is successful. In an embodiment, the AP recovery service can use a timer to identify whether the connection is successful. For example, the AP recovery service can initiate a timer based on attempting to establish the connection. In an embodiment, if the timer concludes with the connection not established, the AP recovery service determines that the connection failed and enters a rescue mode. The length of the timer can be configured by a user (e.g., a system administrator), can be set by default (e.g., without configuration), or can be set using any other suitable technique. If the AP recovery service successfully establishes a connection to the controller, the flow ends. If the AP recovery service fails to establish a connection to the controller, the flow proceeds to block 306.

At block 306, the AP recovery service performs connection diagnostics. For example, the AP recovery service can check any, or all, of whether a suitable cable is connected to the AP, network connectivity (e.g., to a switch system, a gateway, and an external target beyond the gateway), network information (e.g., an IP address or controller information), and any other suitable diagnostic information. This is discussed further, below, with regard to FIG. 4. In an embodiment, the AP recovery service eventually transmits the connection diagnostics to the controller (e.g., using another AP as a relay, as discussed further below with regard to block 312).

At block 308, the AP recovery service identifies candidate rescue APs. For example, the AP recovery service can scan accessible channels using one or more wireless radios, identify compatible neighbors, and sort the compatible neighbors for suitability as a rescue AP (e.g., based on service set identifier (SSID) count for each candidate rescue AP). This is discussed further, below, with regard to FIG. 5.

At block 310, the AP recovery service selects a rescue AP and establishes a connection to the rescue AP. For example, the AP recovery service can select a rescue AP from the candidate rescue APs, and can generate and transmit a rescue mode connection request to establish a secure connection with the rescue AP. This is discussed further below with regard to FIG. 6.

At block 312, the AP recovery service rescues the stranded AP using the rescue AP. For example, the AP recovery service can attempt to establish a connection to the controller using the rescue AP as a secure relay. The AP recovery service can then transmit connection diagnostic information (e.g., identified at block 306, discussed above) to the controller using the rescue AP. The controller can use the diagnostic information to assist in recovery of the stranded AP. For example, the controller can attempt to automatically solve the issue based on the diagnostic information, can provide the diagnostic information to an administrator to assist in solving the issue, or can take any other suitable action. Further, the AP recovery service may be permitted to establish a full connection to the controller through the rescue AP. In an embodiment, this is optional and can be configured (e.g., by an administrator). Rescue of the stranded AP is discussed further, below, with regard to FIG. 7.

Figure 4:
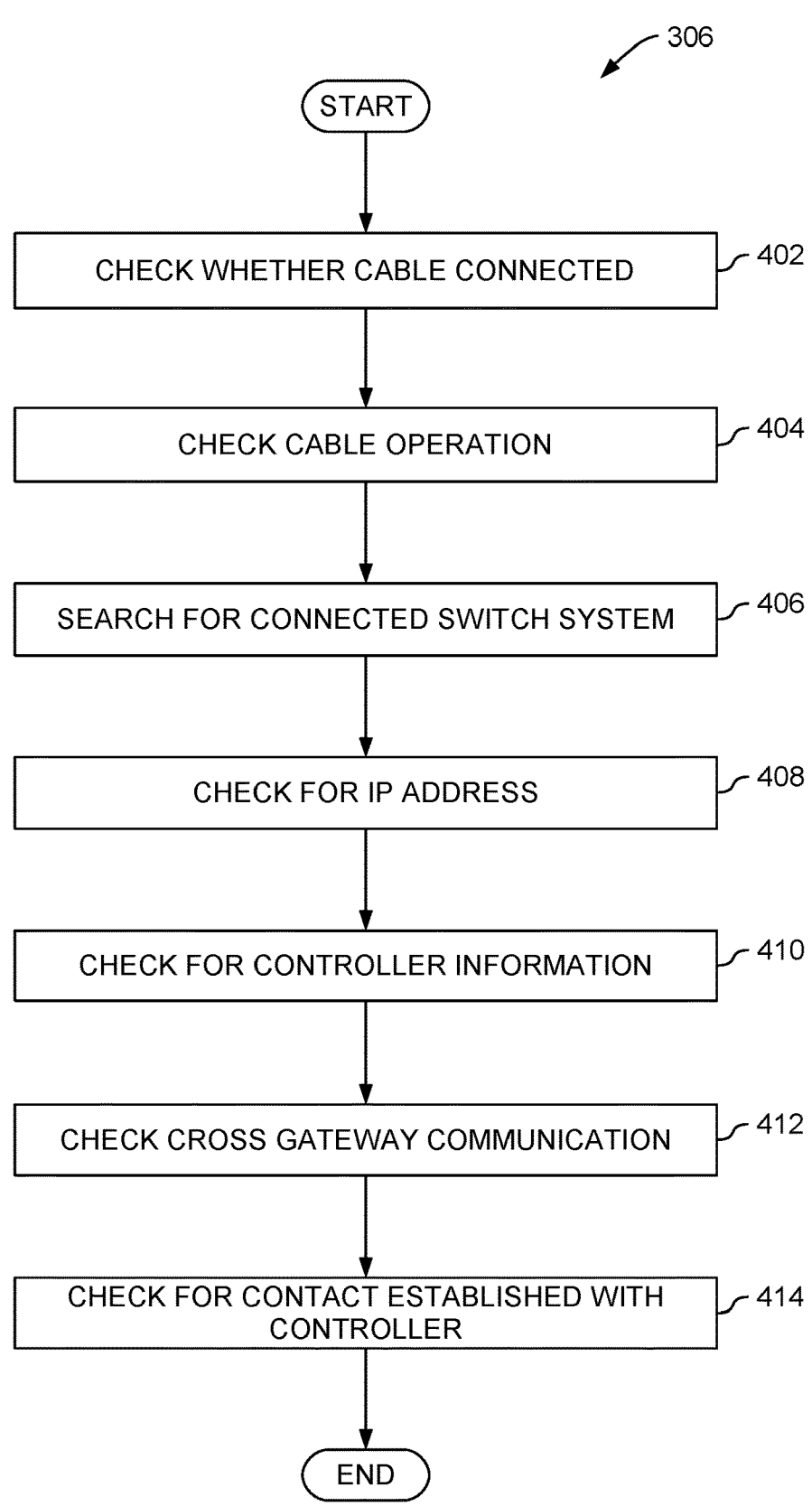
FIG. 4 is a flowchart illustrating performing connection diagnostics for recovery for a stranded AP, according to one embodiment.

FIG. 4 is a flowchart illustrating performing connection diagnostics for recovery for a stranded AP, according to one embodiment. In an embodiment, FIG. 4 corresponds with block 306 illustrated in FIG. 3. At block 402, an AP recovery service (e.g., the AP recovery service 262 illustrated in FIG. 2) checks to see whether a cable is connected to an AP (e.g., the AP 250 illustrated in FIG. 2). For example, the AP recovery service can use a link or interface detection technique (e.g., a unidirectional link detection (UDLD) based technique) to determine whether a cable is connected. UDLD is merely one example, and the AP recovery service can use any suitable technique to determine whether a cable is connected. Further, the AP recovery service can detect a connection to any suitable cable, including an optical cable, an electrical signal transmission cable (e.g., a twisted pair copper cable), or any other suitable cable. In an embodiment, identifying whether a cable is connected can be used to assist in curing a stranded AP. For example, an administrator can be alerted to the disconnected cable so that the administrator can connect it.

At block 404, the AP recovery service checks cable operation. For example, assuming the AP recovery service determines that a cable is connected, the AP recovery service can check whether the cable is operating correctly. For example, it is common that an AP becomes stranded because it is connected to a cable that is not working correct. The AP recovery service can test whether the cable is transmitting correct. As one example, the AP recovery service can perform a time-domain reflectometer (TDR) test by transmitting a signal to the cable and analyzing the reflected signal. This can be done for any, or all, aspects of the cable (e.g., any or all pairs for a twisted pair copper cable). A TDR test is merely one example, and the AP recovery service can use any suitable technique to check cable operation. In an embodiment, checking whether the cable is operating correctly can also be used to assist in curing a stranded AP. For example, an administrator can be alerted to the improper cable so that the administrator can replace the cable or otherwise solve the problem.

At block 406, the AP recovery service searches for a connected switch system. In an embodiment, the AP recovery service attempts to identify a switch system on the other side of the wired interface (e.g., across the cable). For example, the AP recovery service can use a link layer discovery protocol (LLDP), or any other suitable discovery protocol, to identify a connected switch system. The AP recovery system can transmit a query (e.g., consistent with a LLDP) to identify any connected switch system. In an embodiment, searching for a connected switch system can also be used to assist in curing a stranded AP. For example, failure to identify a connected switch system could signify a connectivity problem between the AP and the switching system, or a problem with one or more aspects of the switching system.

At block 408, the AP recovery service checks for an IP address. For example, an AP may be configured to use dynamic host configuration protocol (DHCP) or another suitable protocol to obtain an IP address. In an embodiment, the AP recovery service checks whether the AP is successful and has obtained an IP address. In an embodiment, checking for an IP address can also be used to assist in curing a stranded AP. For example, failure to obtain an IP address can signify a subnet problem, a gateway problem, or some other network problem, for the AP.

At block 410, the AP recovery service checks for controller information. In an embodiment, the AP recovery service can check to see whether the AP has obtained any controller information. For example, the AP recovery service can use DHCP Option 43, domain name system (DNS), or any other suitable information to determine whether the AP has achieved any connection with the controller. In an embodiment, checking for controller can also be used to assist in curing a stranded AP. For example, identifying limited controller information at the AP can signify that the AP is able to reach the controller, but is not able to establish a connection.

At block 412, the AP recovery service checks cross gateway communication. In an embodiment, the AP recovery service can determine whether the AP is able to establish layer 3 (L3) reachability. For example, the AP recovery service can determine whether the AP is able to communicate across a gateway (e.g., to an arbitrary IP address). In an embodiment, checking cross gateway communication can also be used to assist in curing a stranded AP. For example, identifying that the AP can communicate across a gateway can signify that the AP is able to communicate past the controller.

At block 414, the AP recovery service can check for contact established with the controller. In an embodiment, the AP recovery service can determine whether the AP is able to contact the controller, but is not able to establish a connection with the controller. In an embodiment, checking for contact established with the controller can also be used to assist in curing a stranded AP. For example, identifying that the AP can contact the controller can signify that a network transmission path between the AP and the controller is available.

Figure 5:
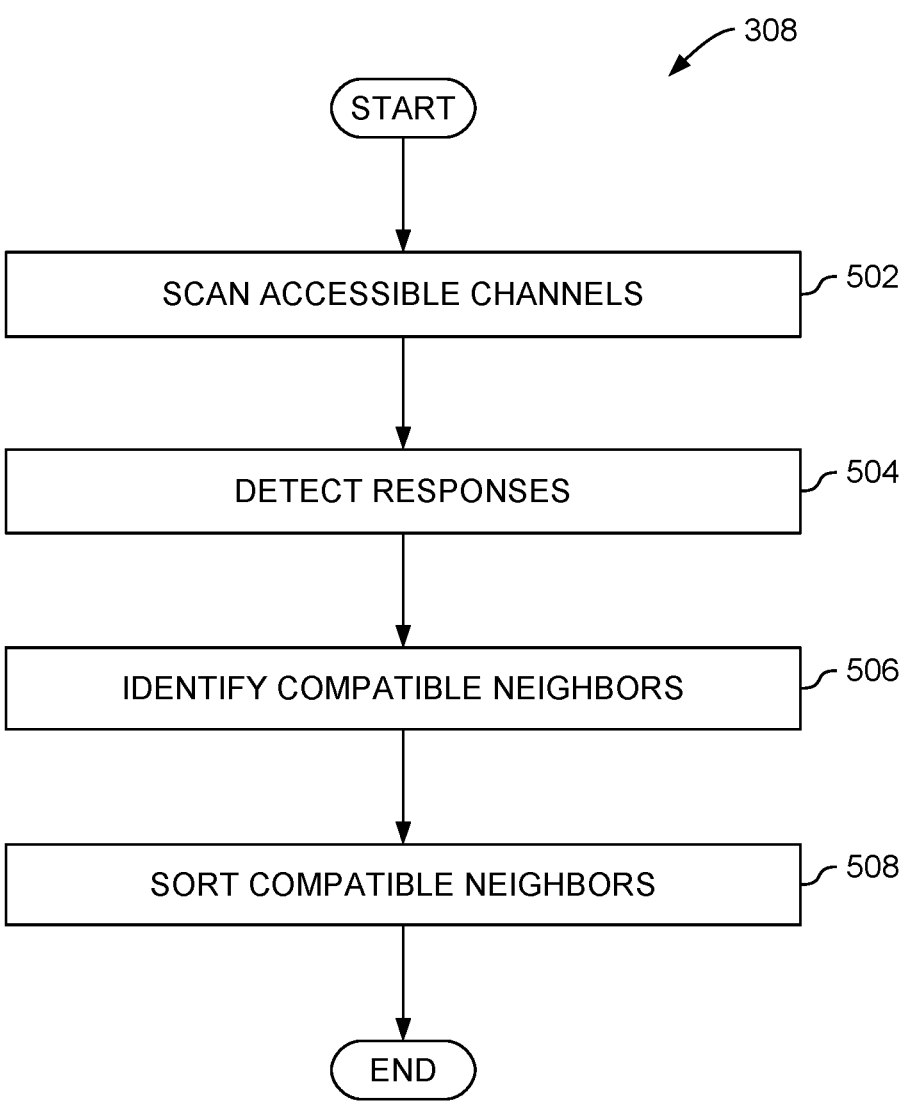
FIG. 5 is a flowchart illustrating identifying candidate rescue APs, according to one embodiment.

FIG. 5 is a flowchart illustrating identifying candidate rescue APs, according to one embodiment. In an embodiment, FIG. 5 corresponds with block 308 illustrated in FIG. 3. At block 502, an AP recovery service (e.g., the AP recovery service 262 illustrated in FIG. 2) scans accessible channels. In an embodiment, APs include the ability to perform some functions as a wireless STA, including scanning for neighbors and associating with other STAs and APs. In an embodiment, the AP recovery service uses one or more wireless radios on the AP to scan accessible channels. For example, the AP recovery service can scan all accessible channels. Alternatively, the AP recovery service scans a subset of accessible channels. This subset can be configured by an administrator, determined by default, and specified in any suitable manner.

At block 504 the AP recovery service detects responses. In an embodiment, the AP recovery service receives responses from nearby STAs to the scanning at block 502. At block 504, the AP recovery service detects responses from neighboring APs.

At block 506, the AP recovery service identifies compatible neighbors. In an embodiment, the AP recovery service can only use compatible neighbor APs for recovery. For example, the AP recovery service may only be able to use neighbor APs from the same vendor, neighbor APs implementing the same recovery software, or neighbor APs compatible in another suitable way. The AP recovery service uses the responses detected at block 504 to identify compatible neighbors. For example, assuming the AP recovery service requires neighbor APs from the same vendor as the stranded AP, the AP recovery service can examine an information element (IE) in a response to identify the vendor of the responding AP. This is merely an example.

At block 508, the AP recovery service sorts compatible neighbors. In an embodiment, the AP recovery service sorts the compatible neighbors to identify likely suitable neighbor APs to use as a rescue AP. For example, the AP recovery service can sort compatible APs by SSID count. In this example, the largest group of compatible neighbor APs advertising the same SSID would be sorted as highest priority, because APs advertising the same SSID are likely to be peer-APs that are connected to a suitable controller.

Figure 6:
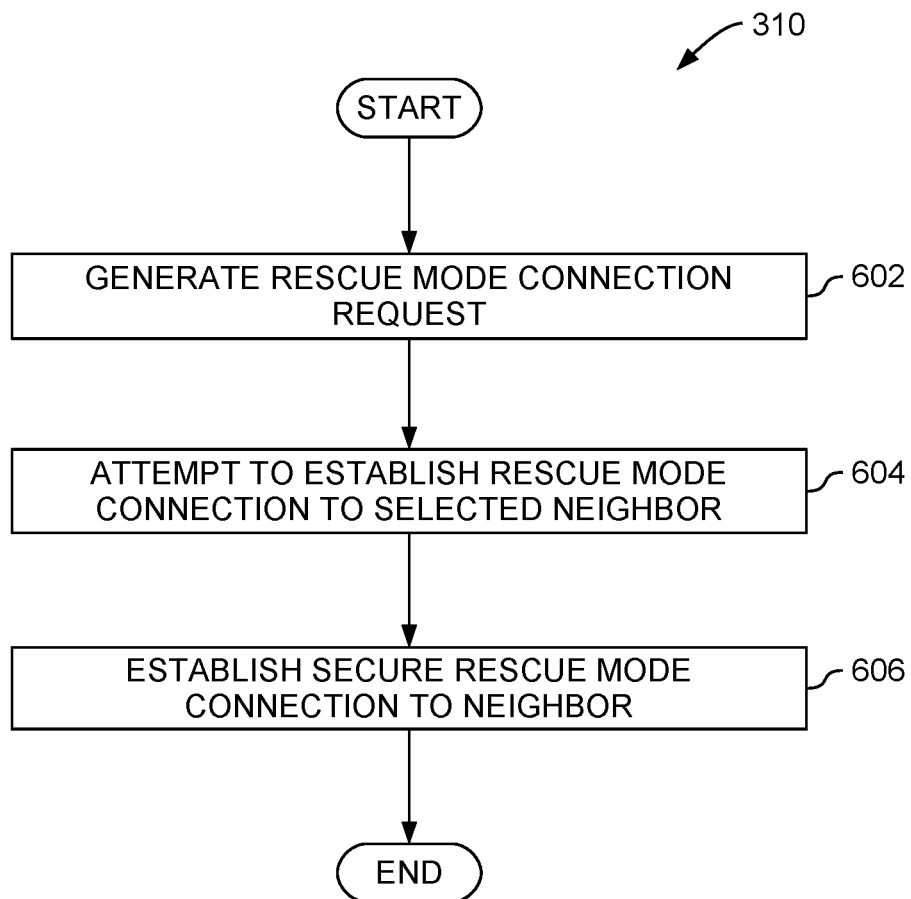
FIG. 6 is a flowchart illustrating selecting a rescue AP, according to one embodiment.

FIG. 6 is a flowchart illustrating selecting a rescue AP, according to one embodiment. In an embodiment, FIG. 6 corresponds with block 310 illustrated in FIG. 3. At block 602, an AP recovery service (e.g., the AP recovery service 262 illustrated in FIG. 2) generates a rescue mode connection request. For example, the AP recovery service can generate a connection request including an indication that the stranded AP is in rescue mode (e.g., an indication in an IE of the message) and is in search of a controller.

At block 604, the AP recovery service attempts to establish a rescue mode connection to a selected neighbor. In an embodiment, as discussed above in relation to FIG. 5, the AP recovery service selects a compatible neighbor AP to use as a rescue AP (e.g., based on sorting neighbor APs by SSID count). The AP recovery service further transmits a rescue mode connection request (e.g., generated at block 602, above) to the selected neighbor AP to establish a rescue mode connection. The target rescue AP (e.g., the selected neighbor AP) can accept the request based on detecting the indication that the stranded AP is in rescue mode (e.g., based on detecting the IE).

At block 606, the AP recovery service establishes a secure rescue mode connection to the selected neighbor AP. In an embodiment, ensuring the security of the connection from the stranded AP to the selected neighbor AP is extremely important. Security vulnerabilities could allow for malicious attacks and harm the overall network security. In an embodiment, the AP recovery service can use any, or all, of multiple techniques to establish a secure connection.

For example, the AP recovery service can establish a connection to the selected neighbor AP using opportunistic wireless encryption (OWE). In an embodiment, OWE is a wireless standard that ensures that the communication between each pair of endpoints is protected from other endpoints (e.g., by establishing a secure tunnel between endpoints). For example, the AP recovery service can use OWE to establish a secure connection to the target rescue AP (e.g., the selected neighbor AP).

As another example, the AP recovery service can establish a connection using pre-association security negotiation (PASN). In an embodiment, PASN allows a pairwise transient key security association (PTKSA) to be established (e.g., between the stranded AP and the rescue AP) prior to an 802.11 association exchange. The AP recovery service can also use PASN to establish a secure connection to the target rescue AP (e.g., the selected neighbor AP).

As a final example, the AP recovery service can establish a complete association to the selected neighbor AP, with security precautions (e.g., using a proprietary hidden SSID, proprietary credentials, or both). For example, the AP recovery service can connect to the selected neighbor AP using one or more of the hidden SSID and proprietary credentials. While this technique may have some security risks because it relies on static credentials, it may be suitable for some circumstances.

Figure 7:
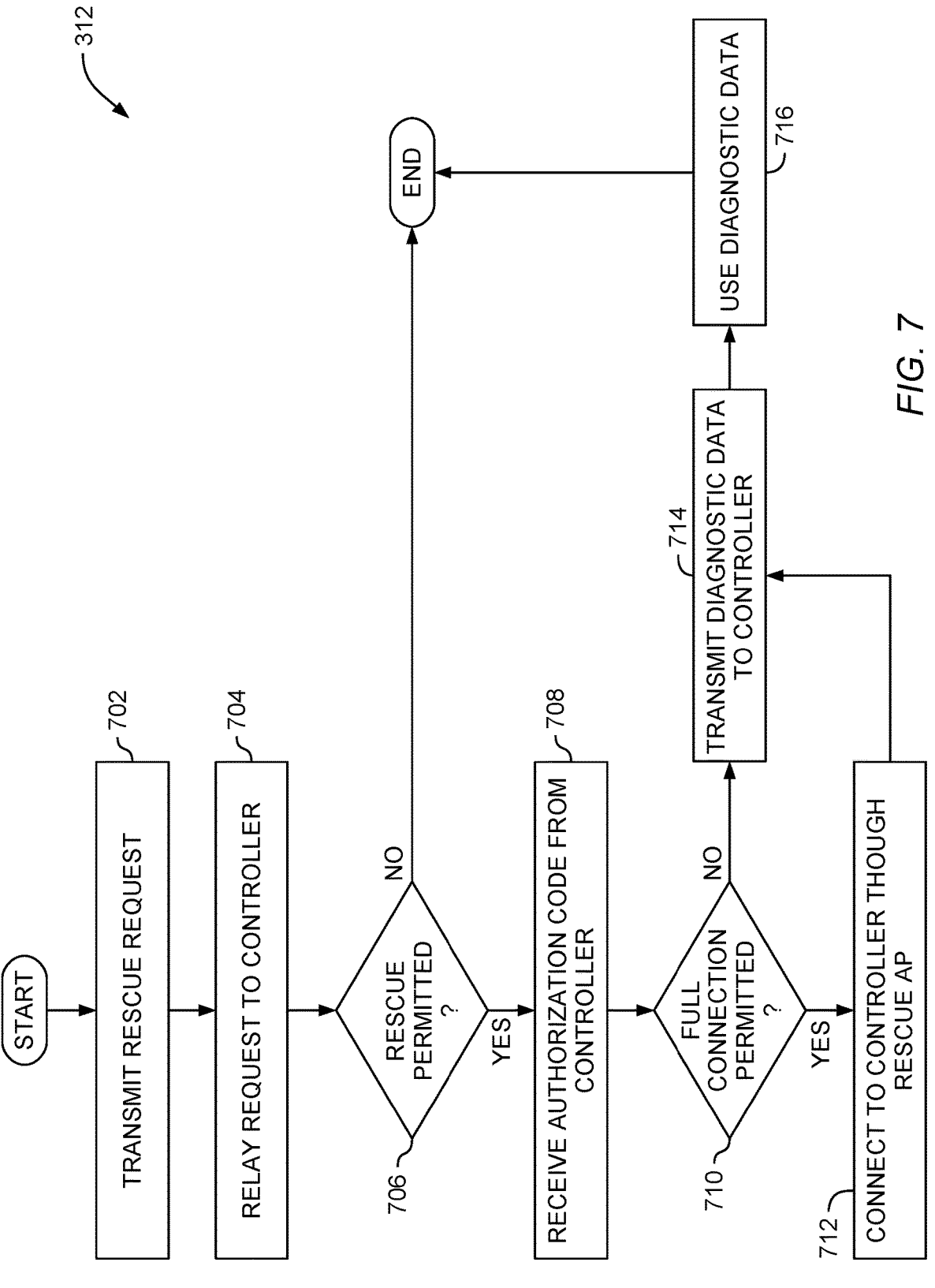
FIG. 7 is a flowchart illustrating rescuing a stranded AP using the rescue AP, according to one embodiment.

FIG. 7 is a flowchart illustrating rescuing a stranded AP using the rescue AP, according to one embodiment. In an embodiment, FIG. 7 corresponds with block 312 illustrated in FIG. 3. At block 702, an AP recovery service (e.g., the AP recovery service 262 illustrated in FIG. 2) transmits a rescue request. For example, once a secure link is established from the stranded AP to the rescue AP (e.g., as discussed above in relation to FIG. 6), the AP recovery service at the stranded AP transmits a rescue request to the rescue AP. In an embodiment, the rescue request identifies the AP radio and media access control (MAC) in use for the stranded AP, and includes a request for rescue. In an embodiment, the MAC address can be associated with the AP wireless radio, or can be any other MAC address associated with the stranded AP (e.g., an Ethernet MAC address, another radio MAC address, or any other MAC address).

In an embodiment, the rescue AP includes filtering measures to ensure that the rescue AP only accepts suitable rescue requests. For example, the rescue AP can accept only correctly formatted requests, can accept only a specified number of rescue requests per time interval, and can filter rescue requests using any other suitable technique. In an embodiment, the filtering measures are configurable (e.g., per AP, per zone, etc.). Further, the rescue AP can include an allow list of allowed APs for rescue (e.g., maintained by a controller) or a deny list of banned APs. The rescue AP can accept, or discard, a rescue request using the filtering measures, the allow and deny lists, or any other suitable technique. This is merely an example, and the rescue AP can also accept any rescue requests.

At block 704, the rescue AP relays the rescue request to the controller. For example, the rescue AP can relay the request to the controller over a protected management channel (e.g., a CAPWAP tunnel). This is merely an example, and the rescue AP can use any suitable secure connection to the controller.

At block 706, a controller recovery service (e.g., the controller recovery service 112 illustrated in FIGS. 1-2) at a controller (e.g., the wireless controller 110 illustrated in FIGS. 1-2) determines whether the rescue request is permitted. For example, the controller can determine that the stranded AP has already been onboarded (e.g., it is not actually stranded) and can ignore the request. As another example, the controller can include an allow list of allowed APs for rescue, a deny list of APs not allowed for rescue, or both. The controller can use one or more of the allow list and the deny list to determine whether the rescue is permitted. If the controller recovery service determines that rescue is not permitted, the flow ends. If the controller recovery service determines that rescue is permitted, the flow proceeds to block 708.

At block 708, the AP recovery service (e.g., at the stranded AP) receives an authorization code from the controller. In an embodiment, if the controller recovery service determines that rescue is permitted, it transmits an authorization code (e.g., a temporal authorization code) to the stranded AP through the rescue AP. For example, the authorization code can include a set of credentials allowing the stranded AP to fully join the network through the rescue AP. As another example, the authorization code can permit the stranded AP to transmit connection diagnostic data (e.g., as discussed above in relation to FIG. 4) to the controller without establishing a full connection.

At block 710, the AP recovery service determines whether full connection to the controller is permitted. In an embodiment, the AP recovery service uses the received authorization code to make this determination. This is merely an example, and the AP recovery service can use any suitable technique. For example, whether full connection is allowed could be pre-determined (e.g., based on configuration by an administrator or based on a default configuration). If the AP recovery service determines that full connection is permitted, the flow proceeds to block 712.

At block 712, the AP recovery service connects to the controller through the rescue AP. For example, as discussed above, the authorization code received at the stranded AP from the controller at block 708 can include credentials to use in establishing a connection to the controller through the rescue AP (e.g., an SSID, username, and password information).

At block 714, the AP recovery service transmits diagnostic data to the controller. For example, the AP recovery service can transmit connection diagnostic information (e.g., discussed above in relation to FIG. 4) to the controller. In an embodiment, the AP recovery service can also transmit neighbor diagnostic information. For example, the AP recovery service can transmit a report (e.g., an 802.11k neighbor report) indicating which neighbor APs were detected by the stranded AP (e.g., while scanning for rescue APs, as discussed above in relation to FIG. 5). The report can further provide information about the neighbor APs, including channel and signal strength information.

At block 716, the diagnostic data is used to rescue the stranded AP. For example, in one embodiment, the controller displays the diagnostic information to an administrator using a suitable user interface. The administrator can use the diagnostic information to identify the stranded AP, and identify the problem that left the AP stranded. In an embodiment, the controller can present multiple stranded APs on a display, and can organize the stranded APs by likely problem (e.g., cable problem, switch problem, DHCP problem, gateway problem, etc.). For example, the controller can display the largest problem groups first.

Alternatively, or in addition, the controller can perform a reverse diagnostic for the stranded AP using the received diagnostic information. For example, the controller can identify IP reachability to the last L3 switch on the path to the stranded AP, can search for neighbors to the stranded AP, can test connectivity to the reported access switch (e.g., using TDR testing), or can use any other suitable technique. In an embodiment, the controller uses this reverse diagnostic information to complement the received diagnostic information, to run tests that the stranded AP may not be able to perform, or to otherwise identify potential problems that the stranded AP itself cannot detect.

As another alternative, or again in addition, the controller provisions the stranded AP with SSID parameters (e.g., through the rescue AP). In an embodiment, the stranded AP can then operate as a normal AP, accepting client traffic and relaying that traffic through the rescue AP (e.g., using a secondary radio or using time division or another multiplexing technique). This can lead to some degradation in performance, but it allows for quasi-normal operation while the problem that left the AP stranded is solved (e.g., while an administrator seeks to solve the problem or while the controller attempts to automatically solve the problem).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
determining that a first wireless access point (AP)—has a failure to connect to a controller;
identifying one or more neighbor APs, for the first AP, as candidate rescue APs;
selecting a rescue AP, from among the candidate rescue APs, and establishing a secure connection from the first AP to the rescue AP; and
transmitting diagnostic data from the first AP to the controller using the secure connection from the first AP to the rescue AP,
wherein the diagnostic data comprises cable diagnostic data for a cable connected to the first AP,
wherein the controller is configured to use the diagnostic data to assist in establishing a connection from the first AP to the controller that bypasses the rescue AP, and
wherein assisting in establishing the connection from the first AP to the controller comprises performing a reverse diagnostic from the controller to the first AP.

2. The method of claim 1, wherein identifying the one or more neighbor APs, for the first AP, as candidate rescue APs comprises:
scanning a plurality of accessible channels, at the first AP, to identify the one or more neighbor APs; and
selecting one or more candidate rescue APs, from the one or more neighbor APs, based on determining that the one or more candidate rescue APs are compatible for rescue of the first AP.

3. The method of claim 2, wherein determining that the one or more candidate rescue APs are compatible for rescue of the first AP is based on analyzing an information element (IE) in a wireless response received to a message relating to the scanning the plurality of accessible channels.

4. The method of claim 3, wherein the IE indicates that the one or more candidate rescue APs are from a same vendor as the first AP.

5. The method of claim 1, wherein selecting the rescue AP, from among the candidate rescue APs, is based on sorting the candidate rescue APs based on a service set identifier (SSID) value associated with each of the respective candidate rescue APs.

6. The method of claim 1, wherein establishing the secure connection from the first AP to the rescue AP comprises establishing a connection using at least one or more of: (i) opportunistic wireless encryption (OWE) or (ii) pre-association security negotiation (PASN).

7. The method of claim 1, wherein establishing the secure connection from the first AP to the rescue AP comprises establishing a connection using a hidden SSID.

8. The method of claim 1, wherein the diagnostic data further comprises at least one of: (i) data relating to one or more neighbors for the first AP, (ii) switch system diagnostic data, (iii) internet protocol (IP) address diagnostic data, (iv) controller connection diagnostic data, or (v) layer 3 (L3) connection diagnostic data.

9. The method of claim 8, wherein the diagnostic data further comprises the data relating to one or more neighbors for the first AP, and wherein the data relating to the one or more neighbors for the first AP reflects at least one of: (i) channel data or (ii) signal strength data for the one or more neighbors.

10. The method of claim 1, wherein assisting in establishing the connection from the first AP to the controller further comprises presenting the diagnostic data to an administrator using an electronic user interface or establishing an association from the first AP to the controller using the rescue AP, wherein the association allows the first AP to transmit wireless station (STA) traffic to the controller through the rescue AP.

11. A first wireless access point (AP), comprising:
one or more wireless radios;
a wired network interface;
a processor; and
a memory having instructions stored thereon which, when executed on the processor, performs operations comprising:
determining that the first AP has a failure to connect to a controller using the wired network interface;
identifying one or more neighbor APs, for the first AP, as candidate rescue APs using at least one of the one or more wireless radios;
selecting a rescue AP, from among the candidate rescue APs, and establishing a secure connection from the first AP to the rescue AP using at least one of the one or more wireless radios; and
transmitting diagnostic data from the first AP to the rescue AP using at least one of the one or more wireless radios,
wherein the rescue AP is configured to relay the diagnostic data to the controller,
wherein the diagnostic data comprises cable diagnostic data for a cable connected to the first AP,
wherein the controller is configured to use the diagnostic data to assist in establishing a connection from the first AP to the controller using the wired network interface, and
wherein assisting in establishing the connection from the first AP to the controller comprises performing a reverse diagnostic from the controller to the first AP.

12. The first AP of claim 11, wherein identifying the one or more neighbor APs, for the first AP, as candidate rescue APs comprises:

scanning a plurality of accessible channels, at the first AP using at least one of the one or more wireless radios, to identify the one or more neighbor APs; and selecting one or more candidate rescue APs, from the one or more neighbor APs, based on determining that the one or more candidate rescue APs are compatible for rescue of the first AP.

13. The first AP of claim 12, wherein determining that the one or more candidate rescue APs are compatible for rescue of the first AP is based on analyzing an information element (IE) in a wireless response received to a message relating to the scanning the plurality of accessible channels.

14. The first AP of claim 11, wherein selecting the rescue AP, from among the candidate rescue APs, is based on sorting the candidate rescue APs based on a service set identifier (SSID) value associated with each of the respective candidate rescue APs.

15. The first AP of claim 11, wherein establishing the secure connection from the first AP to the rescue AP comprises establishing a connection using at least one or more of: (i) opportunistic wireless encryption (OWE) or (ii) pre-association security negotiation (PASN).

16. The first AP of claim 11, wherein assisting in establishing the connection from the first AP to the controller further comprises presenting the diagnostic data to an administrator using an electronic user interface or establishing an association from the first AP to the controller using the rescue AP, wherein the association allows the first AP to transmit wireless station (STA) traffic to the controller through the rescue AP.

17. A non-transitory computer-readable medium having instructions stored thereon which, when executed by a processor, performs operations comprising:

determining that a first wireless access point (AP) has a failure to connect to a controller;

identifying one or more neighbor APs, for the first AP, as candidate rescue APs;

selecting a rescue AP, from among the candidate rescue APs, and establishing a secure connection from the first AP to the rescue AP; and transmitting diagnostic data from the first AP to the controller using the secure connection from the first AP to the rescue AP, wherein the diagnostic data comprises cable diagnostic data for a cable connected to the first AP, wherein the controller is configured to use the diagnostic data to assist in establishing a connection from the first AP to the controller that bypasses the rescue AP, and wherein assisting in establishing the connection from the first AP to the controller comprises performing a reverse diagnostic from the controller to the first AP.

18. The non-transitory computer-readable medium of claim 17, wherein identifying the one or more neighbor APs, for the first AP, as candidate rescue APs comprises:

scanning a plurality of accessible channels, at the first AP, to identify the one or more neighbor APs; and selecting one or more candidate rescue APs, from the one or more neighbor APs, based on determining that the one or more candidate rescue APs are compatible for rescue of the first AP.

19. The non-transitory computer-readable medium of claim 17, wherein establishing the secure connection from the first AP to the rescue AP comprises establishing a connection using at least one or more of: (i) opportunistic wireless encryption (OWE) or (ii) pre-association security negotiation (PASN).

20. The non-transitory computer-readable medium of claim 17, wherein assisting in establishing the connection from the first AP to the controller further comprises presenting the diagnostic data to an administrator using an electronic user interface or establishing an association from the first AP to the controller using the rescue AP, wherein the association allows the first AP to transmit wireless station (STA) traffic to the controller through the rescue AP.

* * * * *